United States Patent
Walsh et al.

[11] Patent Number: 5,896,981
[45] Date of Patent: Apr. 27, 1999

[54] SPLICED CONVEYER BELT METHOD AND APPARATUS

[75] Inventors: J. Ronald Walsh, Hubbard; John C. Homer, III, Chardon; W. Floyd Radcliff, Streetsboro, all of Ohio

[73] Assignee: General Signal Corporation, Stamford, Conn.

[21] Appl. No.: 08/778,493

[22] Filed: Jan. 3, 1997

[51] Int. Cl.$^6$ .............................. B65G 35/00; F16G 3/00
[52] U.S. Cl. ..................... 198/844.2; 198/866; 24/31 R; 24/33 R; 24/33 B
[58] Field of Search .................. 198/812, 866, 198/844.2, 617; 29/272, 282; 24/31 R, 33 R, 33 D, 33 B, 33 C, 39, 31 H, 704.1, 543, 300; 254/134.3 R, 134.3 FT

[56] References Cited

U.S. PATENT DOCUMENTS

| | | | |
|---|---|---|---|
| 734,169 | 7/1903 | Gingras | 69/19 |
| 1,762,191 | 6/1930 | Ober | 254/134.3 R |
| 1,959,490 | 5/1934 | Mistelski | 254/134.3 FT |
| 2,962,782 | 12/1960 | Beach | 24/33 B |
| 3,176,358 | 4/1965 | Leflon | 24/33 B |
| 3,280,435 | 10/1966 | Nasworthy | 24/33 B |
| 4,597,137 | 7/1986 | Droppleman et al. | 24/33 P |
| 4,671,403 | 6/1987 | Schick | 198/844 |
| 5,038,442 | 8/1991 | Stolz et al. | 24/33 P |

*Primary Examiner*—Karen M. Young
*Assistant Examiner*—Steven B. McAllister
*Attorney, Agent, or Firm*—Ohlandt, Greeley, Ruggiero & Perle

[57] ABSTRACT

The apparatus of the present invention includes a tube having locking apparatus at one end that is inserted into a hinge joint in a first direction. A lead wire is inserted into the tube in the opposite direction and locked in place within the tube. Then the tube is withdrawn from the joint with the lead wire still attached. The apparatus also includes a web shaped bib member having at least one opening therein for gripping by a human hand to assist in positioning the belt. The method of the invention has application to a method of securing the first end of a conveyor belt with respect to the second end of the conveyor belt wherein the first end and second end each include part of a hinged joint that includes a plurality of cylindrical section shaped members. This method includes the steps of (1) attaching a web shaped bib, having openings for gripping by an installer, to the cylindrical section shaped members attached to the first end and (2) manipulating the first end relative to the second end by gripping the web shaped body. The method includes the step of thereafter removing the web shaped bib. Other forms of the method in accordance with the invention include substantially aligning the cylindrical section shaped members connected to the first end and the cylindrical section shaped members connected to the second end, inserting in a first direction, a first end of a rigid hollow tube into the cylindrical section shaped members connected to both the first end and the second end, inserting in a second direction, opposite to the first direction, a first axial extremity of a lead wire having the other end thereof connected to an axial extremity of an aircraft cable, into the second end of the rigid hollow tube, clamping the first axial extremity of the lead wire at the second end of the rigid hollow tube, and withdrawing the rigid hollow tube from the cylindrical section shaped parts of the first and second ends.

4 Claims, 3 Drawing Sheets

GRAVIMETRIC FEEDER BELT INSTALLATION METHOD SPLICING PLATFORM

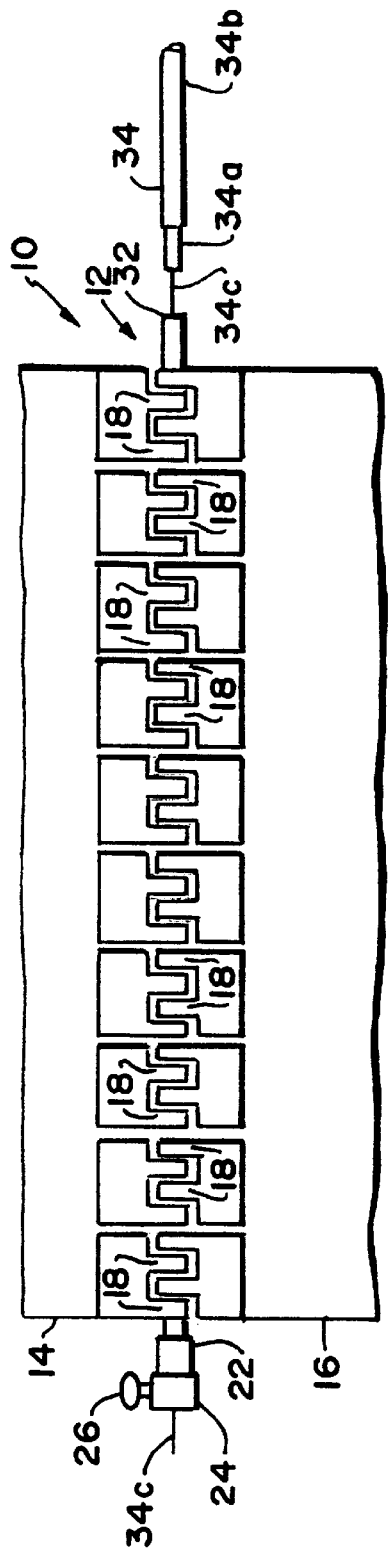
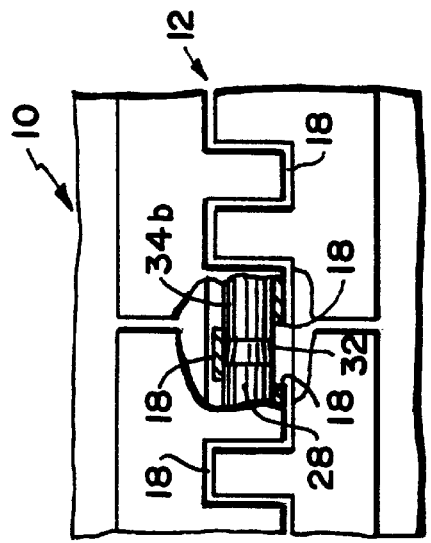
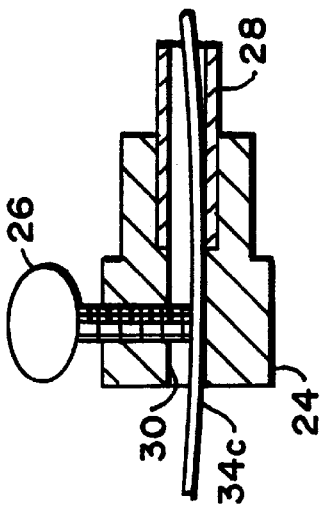
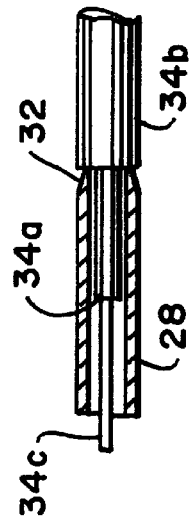
FIG.5
FIG.6
FIG.7
FIG.8

SPLICED CONVEYER BELT METHOD AND APPARATUS

BACKGROUND OF THE INVENTION

This invention relates to a spliced conveyer belt assembly and particularly to an endless belt comprising an elongated belt having a laterally extending joint connecting the ends together. Such belts have applications in various feed mechanisms including gravimetric feeders. Gravimetric feeders are used in a wide variety of applications where it is desired to continually measure the respective weights of one or more materials being supplied to an industrial process on one or more belts. There are a large number of possible applications for such belts. One of many such applications is to feed crushed fuel and sorbent to a combustor in a circulating fluidized bed steam generator. In such an application belt scales are disposed along the belt at spaced intervals along the belt. The apparatus makes possible the measurement and the comparison of the respective weights to enable the control of the supply of gravimetric quantities of sorbent and fuel to the boiler.

Conveyor belts used in gravimetric feeders have particularly rigid standards. These standards include requirements for uniformity througout the axial extent of the belt. This is of great concern since any non-uniformity would result in inconsistent measurement of the same mass at different axial parts of the belt. Another requirement, which is of paramount concern, is that the belt must be extremely flexible so that in the weighing zone near a belt scale the proper impact of weight can be fully transmitted through the belt.

For many years following the introduction of gravimetric feeders in the 1950's, endless belts (those having no mechanical splice of the ends) were primarily used because of the importance of maintaining the required accuracy The major concern with belts having a mechanical splice was the potential for damage to the weighing platform and the potential for inaccuracies because of the non-homogeneous characteristic of the belt as the result of the splice. Because the installation of endless belts on the conveyor apparatus is much more difficult and costly than belts having a splice connecting the ends, most feeder operators have used spliced belts. There are a variety of spliced belts currently on the market.

One known type of spliced belt has a so called hinged joint. The design of such a joint may be visualized by comparison to a conventional hinge such as a common hinge used to hang a door on a door frame or a piano hinge used to mount the cover that covers the keys of a piano. Both the hinged joint and the hinge have a plurality of coaxial, axially abutting, cylindrical elements. In a common hinge the cylindrical elements that are coaxial and axially abutting are alternately connected to (1) the door frame and the door or (2) the cover for the keys and the body of the piano. In a hinged joint for a spliced belt a twisted multistrand aircraft cable extends through a plurality of cylindrical elements. Successive cylindrical elements are alternately fixed to a first end of the belt and a second end of the belt. Accordingly, the first end of the belt can pivot about the common axis of the cable with respect to the second end of the belt. Further details of one such hinged joint is shown in U.S. Pat. No. 5,234,101 issued to Herold on Aug. 10, 1993.

Even spliced belts are difficult to install. The difficulties include (1) the difficulty of moving the bulky and heavy belt into an area that is not easily accessible and (2) the difficulty of making the physical connection between the ends of the belt. A typical belt weighs about 85 to 100 pounds and is 16 feet long. Other belts may be much longer and proportionally heavier. The apparatus within which the belt is mounted typically has first and second housings in which rollers are disposed. Often the access to the rollers over which (or around which) the belt is installed is severely limited. Accordingly, it is difficult to position the relatively heavy and cumbersome belt on the rollers. In some cases C-clamps are tightly secured on the end of the belt and ropes passed through the C-clamps so that a person installing the belt can pull on the rope to position the belt for installation. This process is not desirable (1) because it typically requires two people to position the belt and secure the ends of the belt together and (2) because the C-clamp may damage the belt because of the high compression forces that may be concentrated on a small area.

The difficulty in connecting the ends of the belt is related, in part, to the difficulty of installing the aircraft cable within the cylindrical elements. Much of this problem develops because it is very difficult to precisely align the cylindrical sections and this results in a passageway having a plurality of steps or shoulders along the axial extent of the passageway through which the multistrand cable must be inserted. This is compounded by the cable not being perfectly straight, not being rigid, and sometimes having individual strands that may project from the rest of the twisted strands. The lack of rigidity, the presence of shoulders in the passageway for the cable and the projection of individual cable strands will be understood to be particularly significant because the typical belt has a width of 33 or more inches.

It is an object of the present invention to provide apparatus that facilitates the insertion of an aircraft cable into the cylindrical elements of a conveyor belt hinge joint.

It is another object of the invention is to provide a belt apparatus that is easier to install.

Another object of the invention is to provide apparatus that facilitates installation by only one worker.

Yet another object of the invention is to provide apparatus that will allow a worker to grip the end of the belt in a positive firm manner that will not damage the belt.

Still another object of the invention is provide apparatus that is easy to construct.

SUMMARY OF THE INVENTION

It has now been found that these and other objects of the invention may be attained with some part or parts of the apparatus and process aspects of the present invention. The conveyor belt apparatus in the preferred embodiment of the invention has first and second ends, each of the ends has a plurality of coaxial generally cylindrical section shaped elements connected thereto, all of the elements are dimensioned and configured for mutual interleaved engagement with all of the cylindrical section shaped elements being coaxial and each of the cylindrical section shape elements axially abutting at least one generally cylindrical element connected to the other of the ends, the cylindrical section shaped elements collectively define a common passageway therein. The apparatus further includes an elongated guide tube dimensioned and configured for sliding engagement within the passageway. The tube is rigid and has an axial bore therein dimensioned and configured for receiving a lead wire. A locking device, such as a screw is disposed at a first axial extremity of the guide tube for engagement with an associated lead wire.

In some forms of the invention the tube has a chamfered second axial extremity and the tube has a head disposed at the first axial extremity. The head facillitates insertion and removal of the tube into and out of the passageway. The tube may be dimensioned for receiving a twisted aircraft cable with a jacket thereof disposed in abutting relationship to the second axial extremity.

Other forms of the invention include a conveyor belt having a first and a second end, each of the ends having a plurality of coaxial generally cylindrical section shaped elements connected thereto, all of the elements being dimensioned and configured for mutual interleaved engagement with all of the cylindrical section shaped elements being coaxial and each of the cylindrical sections axially abutting at least one generally cylindrical element connected to the other of the ends, the cylindrical section shaped elements collectively define a common passageway therein. A web shaped bib member having a plurality of generally cylindrical section shaped members disposed in substantially coaxial relationship, the generally cylindrical section shaped members on the bib member being dimensioned and configured for coaxial alignment with the cylindrical section shaped elements connected to the first end of the belt, the bib member including at least one opening therein for gripping by a human hand.

Some forms of the invention include the method of securing the first end of a conveyor belt with respect to the second of the conveyor belt wherein the first end and second end each include part of a hinged joint that includes a plurality of cylindrical section shaped members. This method includes the steps of (1) attaching a web shaped bib, having openings for gripping by an installer, to the cylindrical section shaped members attached to the first end and (2) manipulating the first end relative to the second end by gripping the web shaped body. The method includes the step of thereafter removing the web shaped bib.

Other forms of the method in accordance with the invention include substantially aligning the cylindrical section shaped members connected to the first end and the cylindrical section shaped members connected to the second end, inserting in a first direction, a first end of a rigid hollow tube into the cylindrical section shaped members connected to both the first end and the second end, inserting in a second direction, opposite to the first direction, a first axial extremity of a lead wire having the other end thereof connected to an axial extremity of an aircraft cable, into the second end of the rigid hollow tube, clamping the first axial extremity of the lead wire at the second end of the rigid hollow tube, and withdrawing the rigid hollow tube from the cylindrical section shaped parts of the first and second ends.

The method in accordance with the present invention also includes securing the first end of a conveyor belt with respect to the second of the conveyor belt wherein the first end and the second end each include part of a hinged joint that includes a plurality of cylindrical section shaped members, the method including the steps of substantially aligning the cylindrical section shaped members connected to the first end and the cylindrical section shaped members connected to the second end and then inserting in a first direction, a first end of a rigid hollow tube into the cylindrical section shaped members connected to both the first end and the second end, inserting in a second direction, opposite to the first direction, a first axial extremity of a lead wire having the other end thereof connected to an axial extremity of an aircraft cable, into the second end of the rigid hollow tube, clamping the first axial extremity of the lead wire at the second end of the rigid hollow tube, and withdrawing the rigid hollow tube from the cylindrical section shaped parts of the first and second ends.

BRIEF DESCRIPTION OF THE DRAWING

The invention will be better understood by reference to the accompanying drawing in which:

FIG. 5 is a fragmentary plan view of the joint connecting the ends of a single belt with the guide tube shown in FIG. 2 installed within the alternating cylindrical section shaped elements that alternately are fixed to the first end of the belt and to the second end of the belt.

FIG. 6 is a fragmentary partially sectional view, to an enlarged scale, of the lead wire, guide tube and jacket shown in the right side of FIG. 5.

FIG. 7 is a fragmentary sectional view, to an enlarged scale, of the clamp and lead wire shown in the left side of FIG. 5.

FIG. 8 is a broken away plan view in partial section of a fragment of the hinge joint shown in FIG. 5.

DESCRIPTION OF THE PREFERRED EMBODIMENTS

Figure 1:
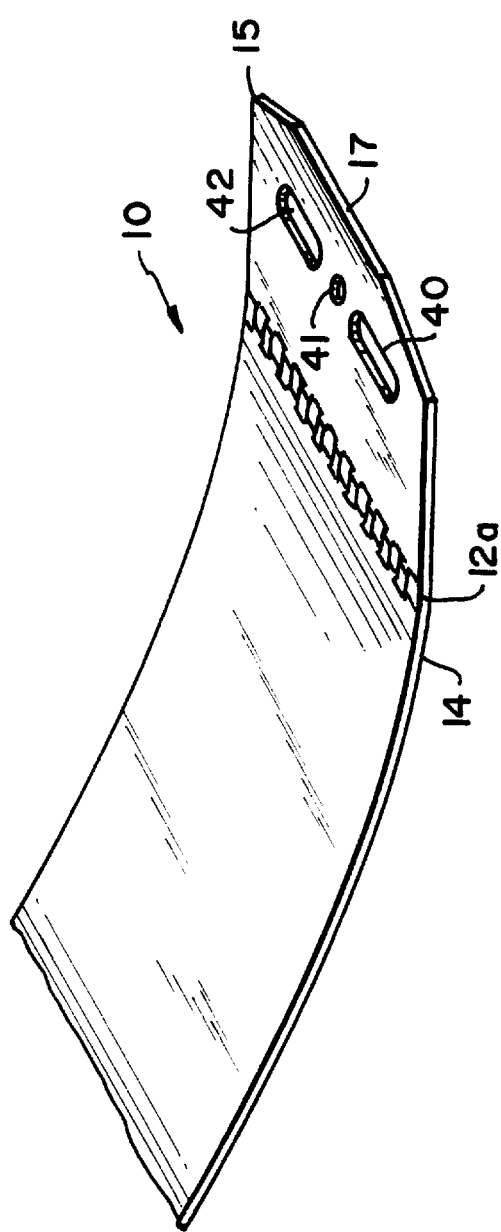
FIG. 1 is a fragmentary perspective view of one end of a conveyor belt which is attached to a bib in accordance with one form of the invention.
Figure 2:
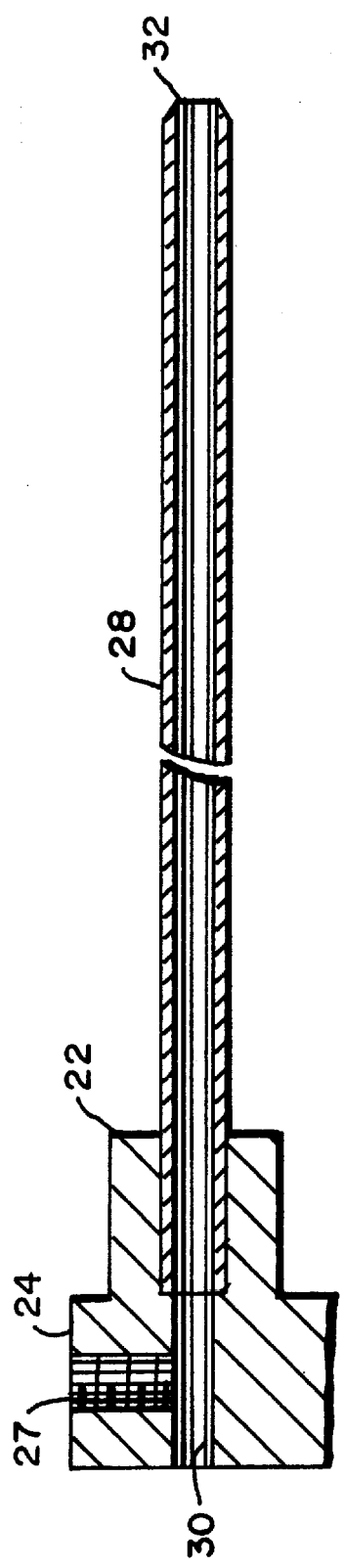
FIG. 2 is an axial cross section of a guide tube in accordance with one form of the invention.

Referring now to FIGS. 1–8 there is shown a belt 10 in accordance with a preferred form of the invention. The belt 10 includes a hinged joint 12 that joins a first end 14 of the belt 10 to a second end 16 of the belt 10. Both the first end 14 and the second end 16 have a plurality of axially spaced, coaxial cylindrical section elements 18 at the axial extremity thereof. As best seen in FIG. 5 the spacing or pitch between these axially spaced cylindrical section shaped elements on each end 14,16 is uniform. In the preferred form of the invention the cylindrical section shaped elements 18 on the first end 14 and the second end 16 are meshed or interdigitated with all of the elements 18 disposed in coaxial relationship. Ideally the cylindrical section shaped elements 18 have a uniform inside diameter and the alignment of all of the cylindrical section shaped elements is perfect. In this idealized scenario the respective inside diameters collectively define a cylindrical passageway. In practice it is difficult to precisely position the first end 14 with respect to the second end 16. Thus, a number of steps or shoulders are defined in the wall of this passageway because of the imprecise alignment of the first end 14 and the second end 16.

The conventional assembly process requires two persons to struggle to attempt the precise alignment of the first end 14 and the second end 16 and thereafter to insert an aircraft cable into the channel defined by the "aligned" cylindrical section shaped elements 18. Often the worker will hammer on individual cylindrical section shaped elements 18 in an attempt to improve alignment. Because the aircraft cable is a multistrand twisted cable some strands of wire may extend from the general body of the cable and hang up on the steps or shoulders caused by the misalignment. The problem is accentuated by the flexible nature of the cable. While the cable is not quite as flexible, there is some analogy to trying to push a wet noodle through a 33 inch long channel having irregularities in the walls.

The present invention facilitates the assembly of the joint between the first end 14 and the second end 16. This facilitation is achieved both with a bib 15 and a guide tube assembly. The guide tube assembly includes the guide tube 22 shown in FIG. 2 and FIG. 7. It will be understood that the head 24 of the guide tube 22 is visible in FIG. 5. The head 24 includes a threaded bore 27. The bore 27 extends diametrically through the circular head 24. (Although the bore 27 has been shown as extending about half way through the head 24 in the preferred embodiment it will be understood that other embodiments may have a bore 27 that extends all the way through the head 24. A thumb screw 26 mates with the threads in the bore 27. The guide tube assembly further includes a rigid tube 28 that is fixed to the head 24. The interior of the tube 28 is coaxial with an axial bore 30 in the head 24. Furthermore the diameter of the bore 30 and the inside diameter of the tube 28 are the same. The outside diameter of the tube 28 is less than the inside diameter of the passageway formed collectively by the aligned cylindrical section shaped elements 18.

The right end (as viewed in FIG. 2) of the guide tube 22 is inserted into the left end (as viewed in FIG. 5) of the passageway defined collectively by the cylindrical section shaped elements 18. This insertion is facilitated by the rigidity of the tube 28, the clearance between the outside diameter of the tube 28 and the passageway and the head 24. The head 24 permits the application of hammer blows to urge the tube 28 into the passageway. The entrance of the tube 28 into successive cylindrical section shaped elements 18 is further aided by the tapered axial extremity 32 of the tube 28.

The guide tube 22 cooperates with a conventional cable 34 comprising a twisted aircraft cable 34a, a plastic jacket 34b and a lead wire 34c. Typically, an axial extremity of the lead wire 34c is silver soldered to an axial extremity of the aircraft cable 34a. The lead wire 34c, the aircraft cable 34a, and the plastic jacket 34b are all coaxial. Ordinarily the lead wire is a single strand of wire. It will be understood that this known cable has been used before and even this known cable 34 with the lead wire 34c is susceptible to hanging on the shoulders formed by misalignment of the cylindrical section shaped elements 18.

In the method in accordance with the present invention the guide tube 22 is inserted into the passageway defined by the cylindrical shaped elements 18 from the left (as viewed in FIG. 5). The lead wire 34c is inserted into the axial extremity of the guide tube 22 having the taper 32 (the right end of the joint as viewed in FIG. 5). When the lead wire 34c is fully inserted in the guide tube 22 the lead wire 34c will extend through the head 24 of the guide tube 22. Thereafter the thumb screw 26 is tightened against the lead wire 34c to prevent relative axial movement. The installer can then grasp the head 24 and pull that head to the left (as viewed in FIG. 5). This pulling withdraws the guide tube 22 from the passageway and draws the cable 34 into the passageway. Ordinarily the outside diameter of the jacket 34b will be slightly larger than the outside diameter of the tube 28. It is desirable to have the outside diameter of the tube 28 slightly smaller than the outside diameter of the jacket 34b to facilitate initial insertion into the passageway. Although the outside diameter of the jacket 34b is larger, the physical characteristics of the plastic jacket (1) facilitates insertion into the passageway and (2) protects the cable 34a. It will be understood that the guide tube 22 may be used again when another hinged joint is being joined together. The cable 34 will be secured in the usual manner and the lead wire 34c will be cut off since it has no further function.

The view of FIG. 8 illustrates further the passage of the connected guide tube 22 and the cable 34 through the passageway defined by the cylindrical section shaped elements 18. It will be seen that the jacket 34b abuts the tapered part 32 of the tube 28 as seen even more clearly in the view of FIG. 6.

Referring now to FIG. 1 there is shown a web shaped bib 15 attached by a joint 12a to an end 14 of a belt 10. The term "web" will be understood from the usage in other fields. In cvil engineering the web is the vertical strip between the upper and lower flanges of a rail or girder. In the paper making field the term web refers to the continuous length of paper formed when paper pulp moves through a paper making machine. The same term is used in the newspaper publishing field to describe a printing press. In the zoology field the term is used to describe the membrane between the digits of animals such as frogs. In the textile field it is used to describe the fabric as it is being woven on a loom. Similarly, the term is used in the plastics field to describe sheet plastic material. In the preferred embodiment the "bib" 15 has a tapered end 17 to facilitate entrance into awkward parts of the feeder. The term "bib" will be understood to be used to describe structure somewhat similar to the bib on overalls or even a baby's bib.

The joint 12a can be identical to the joint shown in FIG. 5 although that is not necessary. The representation of FIG. 1 will be understood to be a schematic representation of the joint shown in FIG. 5. The end 14 of the belt 10 will be identical to that shown in FIG. 5 because the same belt 10 is involved. The bib 15 is an attachment to the belt to facilitate positioning on the conveyor apparatus. Because of the weight, size and awkwardness of handling the belt 10 the bib 15 is of great importance. The bib 15 includes a first elongated slot 40 and an elongated slot 42. Each of these slots is dimensioned for insertion of a human hand to permit the installer to position the belt 10 in the desired place. The bib 15 further includes a hole 41 for insertion of a rope (not shown) which may also be used to aid in placement of the belt 10 and for threading the belt 10 through the feeder assembly (not shown) of a gravimetric feeder (not shown).

It will be seen that the bib 15 facilitates an installer's properly grasping the end of the belt 10 to ease proper placement. After placement is achieved the bib 15 is removed and the splice described above is achieved. This approach eliminates the need for C-clamps with the attendant danger of damage to the belt 10.

Figure 3:
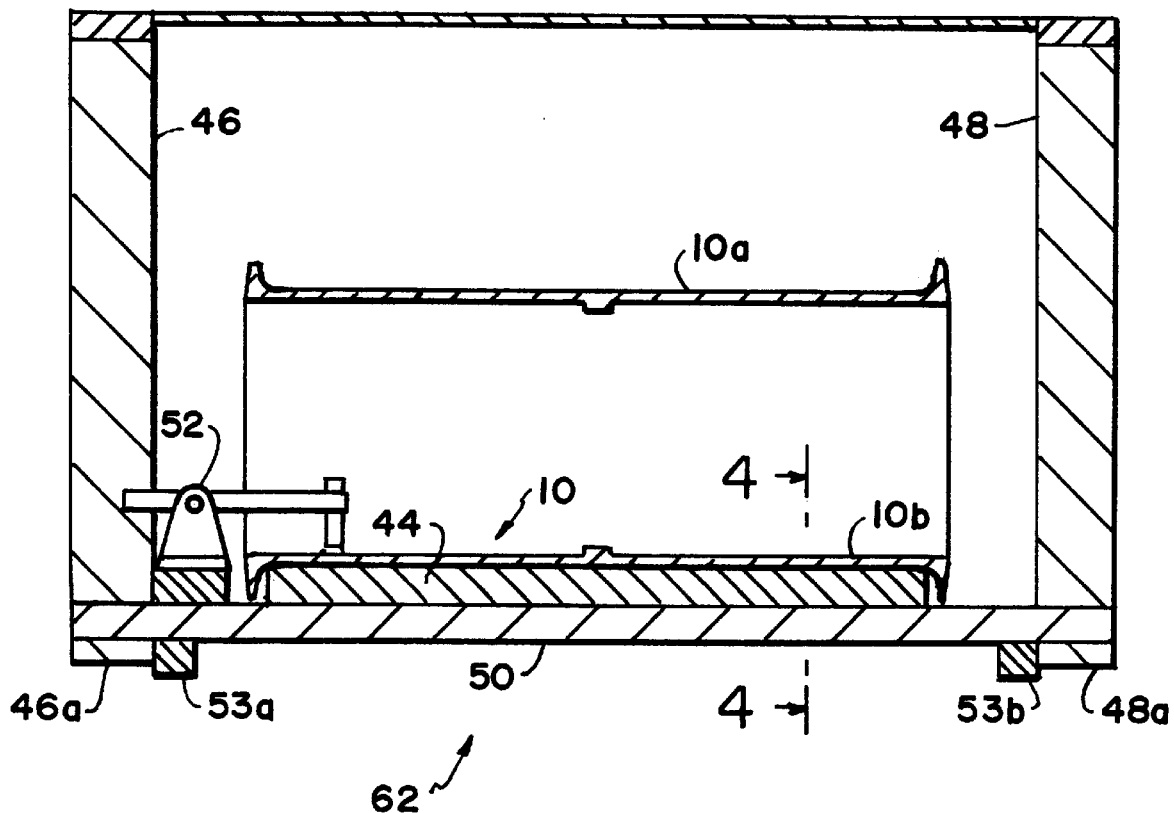
FIG. 3 is an elevational view in partial section of a platform and a cooperating belt that illustrates the manner of connecting the ends of the belt.
Figure 4:
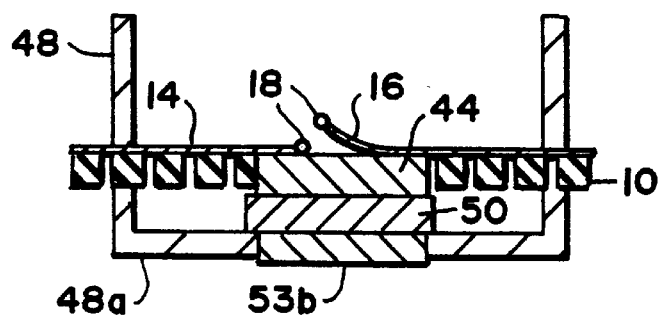
FIG. 4 is a cross sectional view taken along the line 4—4 of FIG. 3.

The connection of the first end 14 and second end 16 is preferably achieved on a platform 62 as shown in FIGS. 3 and 4. The platform 62 is positioned within the body shell of a gravimetric feeder by inserting the platform 62 through an access door frame that includes framing 46, 48, and sills 46a, 48a. More particularly the platform 62 is positioned under the lower flight 10b of the belt 10 and on the sills 46a, 48a. The platform 62 includes a spacer surface 44 that abuts the bottom of the lower flight 10b. (Both an upper flight 10a and a lower flight 10b are disposed within the feeder) In addition, the platform also includes a cross-support 50 that rests on the sills 46a, 48a. The cross-support 50 is secured from lateral movement by blocks 53a and 53b. A clamp 52 grips the end 14 of the belt 10 so that the user may connect the second end 16 in the manner described above. More specifically, the clamp 52 stabilizes the end 14 of the belt 10 on platform 42. The clamp 52 is located in a position where it will not damage the cylindrical section shaped elements 18. It will be understood that the clamp 52 is not likely to damage the belt 10 because the clamping action is against the wooden material of the surface 44 as opposed to the metal surface on both sides of a C-clamp which was sometimes used in prior art procedures.

Although the invention has been described in terms of a set screw 26 that secures the lead wire 34c it will be understood that any of various other locking structures could be used. For example, a locking plier with an over center locking mechanism such as that identified by the trademark Vice Grip would achieve that result.

It will thus be seen that the method includes positioning the first end 14 of a conveyor belt 10 with respect to the second end 16 of the conveyor belt 10 wherein said first end 14 and second end 16 each include part of a hinged joint 12 that includes a plurality of cylindrical section shaped members 18. The method includes the steps of attaching a web shaped bib 15, having openings 40, 42 for gripping by an installer, to the cylindrical section shaped members 18 attached to said first end 14 and manipulating the first end 14 relative to said second end 16 by gripping the web shaped bib 15; and thereafter removing said web shaped bib member 15.

Other forms of the method in accordance with the invention include substantially aligning the cylindrical section shaped members 18 connected to the first end 14 and the cylindrical section shaped members 18 connected to the second end 16, inserting in a first direction, (such as from the left) a first end of a rigid hollow tube 22 into the cylindrical section shaped members 18 connected to both the first end 14 and the second end 16, inserting in a second direction (such as the right), opposite to the first direction, a first axial extremity of a lead wire 34c having the other end thereof connected to an axial extremity of an aircraft cable 34a, into the second end of the rigid hollow tube 22, clamping the first axial extremity of the lead wire at the second end of the rigid hollow tube, and withdrawing the rigid hollow tube 22 from the cylindrical section shaped parts 18 of the first and second ends 14, 16.

The invention has been described with reference to its illustrated preferred embodiment. Persons skilled in the art of such devices may upon exposure to the teachings herein, conceive other variations. Such variations are deemed to be encompassed by the disclosure, the invention being delimited only by the following claims.

Having thus described our invention we claim:

1. A conveyor belt apparatus comprising:

a belt of the type having a first and second ends, each of the ends having a plurality of coaxial generally cylindrical section shaped elements connected thereto, all of the elements being dimensioned and configured for mutual interleaved engagement with all of said cylindrical section shaped elements being coaxial and each of said cylindrical section shape elements axially abutting at least one generally cylindrical element connected to the other of said ends, the cylindrical section shaped elements collectively defining a common passageway therein;

a cable having a lead wire attached to one end thereof;

means for establishing a splice connection for said belt by positioning said cable within said passageway, said means for establishing including:

an elongated tube dimensioned and configured for sliding engagement within the passageway, said tube being rigid and having an axial bore therein dimensioned and configured for receiving said lead wire when inserted into said passageway;

a locking means disposed at a first axial extremity of said guide tube for engagement with said lead wire; and wherein said cable is drawn into said passageway as said tube is withdrawn from said passageway.

2. The apparatus as described in claim 1 wherein:

said tube has a chamfered second axial extremity.

3. The apparatus as described in claim 2 wherein:

said tube has a head disposed at said first axial extremity, said head facilitating insertion and withdrawal of said tube into and out of the passageway.

4. The apparatus as described in claim 3 wherein:

said cable is a twisted aircraft cable having a jacket, said cable disposed in abutting relationship to said second axial extremity.

* * * * *